United States Patent [19]
Brandes et al.

[11] Patent Number: 5,770,542
[45] Date of Patent: Jun. 23, 1998

[54] METHOD FOR UPGRADING WAXY FEEDS USING A CATALYST COMPRISING MIXED POWERED DEWAXING CATALYST AND POWDERED ISOMERIZATION CATALYST FORMED INTO A DISCRETE PARTICLE

[75] Inventors: Dee Anne Brandes, Calgary; David N. Zinkie; Sandra J. Alward, both of Sarnia, all of Canada

[73] Assignee: Exxon Research & Engineering Company, Florham Park, N.J.

[21] Appl. No.: 795,057

[22] Filed: Feb. 5, 1997

Related U.S. Application Data

[63] Continuation of Ser. No. 343,387, Nov. 22, 1994, abandoned.

[51] Int. Cl.$^6$ .................................................. B01J 21/00
[52] U.S. Cl. ............................... 502/527; 502/67; 502/68
[58] Field of Search ............................... 208/65, 67, 68, 208/521

[56] References Cited

U.S. PATENT DOCUMENTS

| | | | |
|---|---|---|---|
| 2,941,960 | 6/1960 | Hinden et al. | 252/455 |
| 4,141,859 | 2/1979 | Plank et al. | 252/455 |
| 4,247,422 | 1/1981 | Davies | 252/472 |
| 4,302,358 | 11/1981 | Pellet et al. | 252/441 |
| 4,418,006 | 11/1983 | Kim et al. | 502/73 |
| 4,556,477 | 12/1985 | Dwyer | 208/111 |
| 4,574,043 | 3/1986 | Chester et al. | 208/59 |
| 4,575,416 | 3/1986 | Chester et al. | 208/111 |
| 4,584,089 | 4/1986 | Unmuth et al. | 208/65 |
| 4,600,497 | 7/1986 | Ward et al. | 208/89 |
| 4,610,778 | 9/1986 | Graven | 208/89 |
| 4,650,917 | 3/1987 | Dessau et al. | 585/329 |
| 4,683,214 | 7/1987 | Angevine et al. | 502/66 |
| 4,696,732 | 9/1987 | Angevine et al. | 208/111 |
| 4,717,465 | 1/1988 | Chem et al. | 208/111 |
| 4,810,357 | 3/1989 | Chester et al. | 208/78 |
| 4,900,707 | 2/1990 | Cody et al. | 502/230 |
| 4,906,350 | 3/1990 | Lucien et al. | 208/197 |
| 4,906,601 | 3/1990 | Cody et al. | 502/230 |
| 4,911,821 | 3/1990 | Katzer et al. | 208/27 |
| 4,916,001 | 4/1990 | Whittenberg | 428/116 |
| 4,919,786 | 4/1990 | Hammer et al. | 208/27 |
| 4,919,788 | 4/1990 | Chen et al. | 208/59 |
| 4,923,588 | 5/1990 | Cody et al. | 208/27 |
| 4,929,795 | 5/1990 | Cody et al. | 585/739 |
| 4,937,399 | 6/1990 | Wachter et al. | 585/749 |
| 4,943,672 | 7/1990 | Hammer et al. | 585/737 |
| 4,959,337 | 9/1990 | Cody et al. | 502/230 |
| 4,975,177 | 12/1990 | Garwood et al. | 208/23 |
| 4,992,159 | 2/1991 | Cody et al. | 208/89 |
| 5,037,528 | 8/1991 | Garwood et al. | 208/27 |
| 5,059,299 | 10/1991 | Cody et al. | 208/27 |
| 5,122,258 | 6/1992 | Eadie et al. | 208/112 |
| 5,135,638 | 8/1992 | Miller | 208/27 |
| 5,158,671 | 10/1992 | Cody et al. | 208/264 |
| 5,182,248 | 1/1993 | Cody et al. | 502/230 |
| 5,200,382 | 4/1993 | Cody et al. | 502/204 |
| 5,246,566 | 9/1993 | Miller | 208/27 |
| 5,254,518 | 10/1993 | Soled et al. | 502/241 |
| 5,282,958 | 2/1994 | Santilli et al. | 208/111 |
| 5,290,426 | 3/1994 | Cody et al. | 208/27 |
| 5,543,035 | 8/1996 | Ziemer | 208/111 |

FOREIGN PATENT DOCUMENTS

| | | | |
|---|---|---|---|
| 044965A1 | 2/1982 | European Pat. Off. | B01J 29/02 |
| 183363A1 | 6/1986 | European Pat. Off. | C10G 45/64 |
| WO9113131 | 9/1991 | WIPO | C10G 45/64 |

*Primary Examiner*—Helane Myers
*Attorney, Agent, or Firm*—Joseph J. Allocca; James H. Takemoto

[57] ABSTRACT

It has been discovered that waxy feeds can be upgraded using a catalyst made by combining powdered dewaxing catalyst with powdered isomerization catalyst said mixture of powdered catalysts being formed into a discrete particle.

3 Claims, No Drawings

5,770,542

METHOD FOR UPGRADING WAXY FEEDS USING A CATALYST COMPRISING MIXED POWERED DEWAXING CATALYST AND POWDERED ISOMERIZATION CATALYST FORMED INTO A DISCRETE PARTICLE

This application is a continuation of application Ser. No. 08/343,387, filed Nov. 22, 1994, now abandoned.

BACKGROUND OF THE INVENTION

1. Field of the Invention

This invention relates to the catalytic treatment of waxy feeds including slack wax, Fischer-Tropsch wax, waxy raffinates and waxy distillates to produce an upgraded liquid product, such as a lube oil product having improved pour point, viscosity, viscosity index, reduced sulfur and/or nitrogen content as compared to the waxy feeds.

2. Description of the Related Art

The isomerization of wax and waxy feeds to liquid products boiling in the lube oil boiling range and catalysts useful in such practice are well known in the literature. Preferred catalysts in general comprise noble Group VIII metals on halogenated refractory metal oxide support, e.g. platinum on fluorided alumina. Other useful catalysts can include noble Group VIII metals on refractory metal oxide support such as silica/alumina which has their acidity controlled by use of dopants such as yttria. Isomerization processes and catalysts used in such processes are disclosed and claimed in numerous patents, see U.S. Pat. No. 5,059,299; U.S. Pat. No. 5,158,671; U.S. Pat. No. 4,906,601; U.S. Pat. No. 4,959,337; U.S. Pat. No. 4,929,795; U.S. Pat. No. 4,900,707; U.S. Pat. No. 4,937,399; U.S. Pat. No. 4,919,786; U.S. Pat. No. 5,182,248; U.S. Pat. No. 4,943,672; U.S. Pat. No. 5,200,382; U.S. Pat. No. 4,992,159, U.S. Pat. No. 4,923,588, U.S. Pat. No. 5,294,926, U.S. Pat. No. 5,254,518. The search for new and different catalysts or catalyst systems which exhibit improved activity, selectivity or longevity, however, is a continuous ongoing exercise.

Catalytic dewaxing is also a process well documented in the literature, see for example, U.S. Pat. No. 5,135,638, U.S. Pat. No. 5,246,566, U.S. Pat. No. 5,282,958, U.S. Pat. No. 5,037,528, U.S. Pat. No. 4,975,177, U.S. Pat. No. 4,919,788, U.S. Pat. No. 4,9111,821, U.S. Pat. No. 4,906350, U.S. Pat. No. 4,696,732, U.S. Pat. No. 4,610,778, U.S. Pat. No. 4,717,465, U.S. Pat. No. 4,574,043, U.S. Pat. No. 4,556,477, U.S. Pat. No. 4,810,357. Isomerization of linear olefins using zeolites is also addressed in the literature, see, for example, U.S. Pat. No. 5,321,194, U.S. Pat. No. 5,237,121.

U.S. Pat. No. 4,141,859 teaches a novel reforming catalyst and process using such catalyst. Zeolites of controlled activity are mixed with reforming catalyst to yield a composite which is then used as part of a catalyst system including an additional component which is a conventional reforming catalyst. The composite comprises up to 25 wt % of a zeolite of controlled acidity and which may be cation exchanged to contain H, Pt, Pd, etc., in combination with not less than 75 wt % of a carrier material containing 0.01 to about 2 wt % platinum either alone or in combination with other metals and from 0.01 to about 3 wt % halide. The carrier material is preferably alumina. The composite can be prepared by pre-milling a conventional reforming catalyst and mixing it with the zeolite and ball milling the mixture then pelleting the mixture to the desired size.

U.S. Pat. No. 4,418,006 teaches a hydrocarbon conversion catalyst system comprising a mixture of a first catalyst containing a noble metal on a refractory inorganic oxide and a second catalyst containing a non-noble metal on a crystalline alumina silicate material dispersed in a high surface area, porous refractory inorganic oxide. The second catalyst can be prepared in any number of ways, one of which involves taking the zeolite which has been cation exchanged and pulverizing it to a powder and physically mixing it with finely divided powder of refractory inorganic oxide and pelleting the mixture and impregnating the pellet with the non-noble metal component. The final system comprising the first catalyst and the second catalyst is then prepared. One method involves reducing the size of each particle, blending the reduced size particles and pelleting the blended mixture.

U.S. Pat. No. 4,302,358 teaches an improved reforming catalyst of improved activity comprising a first component containing a Group VIII noble metal deposed on a solid acidic support and a second component comprising rhenium or compound thereof deposit on a solid catalyst support. It is taught that there is a substantial activity increase by thoroughly and intimately blending finely-divided particles of the first and second components to provide a thoroughly-blended composite and subsequently forming the blended composite into larger particles, in contrast to using only a particulate mixture of the first and second catalyst components.

U.S. Pat. No. 4,584,089 teaches a reforming catalyst comprising a two component mixture of thoroughly blended finely divided particles of a first component comprising a Group VIII noble metal on a support having acid catalyst sites and a second component comprising a crystalline borosilicate molecular sieve to produce a thoroughly blended components and forming said composite into particles.

DESCRIPTION OF THE INVENTION

The present invention is directed to a unitized mixed powder pellet catalyst and to a method for upgrading waxy feeds using the unitized mixed powder pellet catalyst. The term "unitized" as used here and in the claims means that each pellet is one made by mixing together powdered molecular sieve dewaxing catalyst(s) with powdered amorphous isomerization catalyst(s) and pelletizing the mixture to produce pellets each of which contain all of the powder components previously recited.

The unitized powder pellet catalyst has been found to produce superior results as compared to using individual catalysts corresponding to the separate components of the mixed powder unitized pellet catalyst.

The unitized catalyst can be prepared by starting with individual finished catalysts, pulverizing and powdering such individual finished catalysts, mixing the powdered materials together to form a homogeneous mass, then compressing/extruding and pelleting thus producing the unitized pellet catalysts comprising a mixture of the individual, different, and distinct catalyst components. Pulverizing and powdering is to a consistency achievable using a mortar and pestle or other such conventional powdering means.

Alternatively individual finished catalysts can be pulverized and powdered then the powdered materials can be mixed together, boehmite or pseudo boehmite powder can be added to the powder mix, the mix can then be compressed/extruded and pelleted and the pellet calcined to covert the boehmite/pseudo-boehmite into alumina resulting in the production of a physically strong, attrition resistant unitized pellet catalyst.

The unitized pellet catalyst can be prepared from a wide variety of individual dewaxing and isomerization catalysts.

The dewaxing catalyst is a 10 member ring unidirectional inorganic oxide molecular sieve having generally oval 1-D pores having a minor axis between about 4.2 Å and about 4.8 Å and a major axis between about 5.4 Å and about 7.0 Å as determined by X-ray crystallography. The molecular sieve is preferably impregnated with from 0.1 to 5 wt %, more preferably about 0.1 to 3 wt % of at least one Group VIII metal, preferably a noble Group VIII metal, most preferably platinum or palladium.

While the effective pore size as discussed above is important to the practice of the invention not all intermediate pore size molecular sieves having such effective pore sizes are advantageously usable in the practice of the present invention. Indeed, it is essential that the intermediate pore size molecular sieve catalysts used in the practice of the present invention have a very specific pore shape and size as measured by X-ray crystallography. First, the intracrystalline channels must be parallel and must not be interconnected. Such channels are conventionally referred to as 1-D diffusion types or more shortly as 1-D pores. The classification of intrazeolite channels as 1-D, 2-D and 3-D is set forth by R. M. Barrer in Zeolites, Science and Technology, edited by F. R. Rodrigues, L. D. Rollman and C. Naccache, NATO ASI Series, 1984 which classification is incorporated in its entirety by reference (see particularly page 75).

The second essential criterion as mentioned above is that the pores must be generally oval in shape, by which is meant the pores must exhibit two unequal axes, referred to herein as a minor axis and a major axis. The term oval as used herein is not meant to require a specific oval or elliptical shape but rather to refer to the pores exhibiting two unequal axes. Thus, as previously stated the 1-D pores of the catalysts useful in the practice of the present invention must have a minor axis between about 4.2 Å and about 4.8 Å and a major axis between 5.4 Å and about 7.0 Å as determined by conventional X-ray crystallography measurements.

Zeolites which are considered to be in this pore range include ZSM-5, ZSM-11, etc. Upon careful examination of the intermediate pore size zeolites, however, it has been found that not all of them are efficient as a catalyst for isomerization of a paraffin-containing feedstock. The intermediate pore size zeolites forming part of the present invention are those which in addition to having the correct pore size are also unidirectional. Such 10 member ring, unidirectional zeolites include ZSM-22, ZSM-23, ZSM-35, ferrierite, ZSM-48, and clinoptilolite and materials isostructural with these as defined Atlas of Zeolite Structure types by S. M. Mier and D. H. Olson., Third Revised Edition 1992.

The most preferred intermediate pore size silicoaluminophosphate molecular sieve for use in the process of the invention is SAPO-11. SAPO-11 comprises a molecular framework of corner-sharing ($SiO_2$) tetrahedra, (AlO2) tetrahedra and ($PO_2$) tetrahedra.

The isomerization catalyst component can be any of the typical isomerization catalyst such as those comprising refractory metal oxide support base (e.g., alumina, silica-alumina, zirconia, titanium, etc.) on which has been deposited a catalytically active metal selected from the group consisting of Group VI B, Group VII B, Group VIII metals and mixtures thereof, preferably Group VIII, more preferably noble Group VIII, most preferably Pt or Pd and optionally including a promoter or dopant such as halogen, phosphorus, boron, yttria, magnesia, etc. preferably halogen, yttria or magnesia, most preferably fluorine. The catalytically active metals are present in the range 0.1 to 5 wt %, preferably 0.1 to 3 wt %, more preferably 0.1 to 2 wt %, most preferably 0.1 to 1 wt %. The promoters and dopants are used to control the acidity of the isomerization catalyst. Thus, when the isomerization catalyst employs a base material such as alumina, acidity is imparted to the resultant catalyst by addition of a halogen, preferably fluorine. When a halogen is used, preferably fluorine, it is present in an amount in the range 0.1 to 10 wt %, preferably 0.1 to 3 wt %, more preferably 0.1 to 2 wt % most preferably 0.5 to 1.5 wt %. Similarly, if silica-alumina is used as the base material, acidity can be controlled by adjusting the ratio of silica to alumina or by adding a dopant such as yttria or magnesia which reduces the acidity of the silica-alumina base material as taught on U.S. Pat. No. 5,254,518 (Soled, McVicker, Gates, Miseo). As with the dewaxing catalyst composite, one or more isomerization catalysts can be pulverized and powdered, and mixed producing the second component of the unitized mixed pellet catalyst.

The isomerization catalyst can also be the mixture of discrete particle pair catalysts described and claimed in copending application U.S. Ser. No.08/332,988, filed Nov. 1, 1994 (Attorney Docket Number LAW081) in the names of Ian A. Cody and Alberto Ravella now U.S. Pat. No. 5,565, 086. That catalyst comprises a mixture of discrete particles of two catalysts having acidities in the range 0.3 to 2.3 wherein the catalysts of the catalyst pair have acidities differing by about 0.1 to about 0.9 wherein acidity is determined by the technique of McVicker-Kramer as described in "Hydride Transfer and Olefin Isomerization as Tools to Characterize Liquid and Solid Acids, Acc Chem Res 19, 1986, pg. 78–84. In general one of the catalysts is deemed to be a high acidity catalyst having an acidity as evidenced by having a 3-methylpent-2-ene to 4-methylpent-2-ene ratio in the range 1.1 to 2.3 whereas the other catalyst will be a low acidity catalyst as evidenced by having a 3 methylpent-2-ene to 4 methylpent-2-ene ratio in the range 0.3 to about 1.1.

This method measures the ability of catalytic material to convert 2 methylpent-2-ene into 3 methylpent-2-ene and 4 methylpent-2-ene. More acidic materials will produce more 3 methylpent-2-ene (associated with structural rearrangement of a carbon atom on the carbon skeleton). The ratio of 3 methylpent-2-ene to 4 methypent-2-ene formed at 200° C. is a convenient measure of acidity. Isomerization catalyst acidities as determined by the above technique lies in the ratio region in the range of about 0.3 to about 2.5, preferably about 0.5 to about 2.0. Zeolitic dewaxing catalysts have acidities, as determined by the above technique which lie in the ratio region in the range of about 2.5 to 3.0, preferably 2.6 to 2.8.

For a number of catalysts the acidity as determined by the McVicker/Kramer method, i.e., the ability to convert 2 methylpent-2-ene into 3 methylpent-2-ene and 4 methylpent-2-ene at 200° C., 2.4 w/h/w, 1.0 hour on feed wherein acidity is reported in terms of the mole ratio of 3 methylpent-2-ene to 4-methylpent-2-ene, has been correlated to the fluorine content of platinum on fluorided alumina catalyst and to the yttria content of platinum on yttria doped silica/alumina catalysts. This information is reported below.

Acidity of 0.3% Pt on fluorided alumina at different fluorine levels:

| F Content (%) | Acidity (McVicker/Kramer) |
|---|---|
| 0.5 | 0.5 |
| 0.75 | 0.7 |
| 1.0 | 1.5 |
| 1.5 | 2.5 |
| 0.83 | 1.2 (interpolated) |

Acidity of 0.3% Pt on yttria doped silica/alumina initially comprising 25 wt % silica:

| Yttria Content (%) | Acidity (McVicker/Kramer) |
|---|---|
| 4.0 | 0.85 |
| 9.0 | 0.7 |

In practicing the present invention the feed to be isomerized can be any wax or waxy containing feed such as slack wax, which is the wax recovered from a petroleum hydrocarbon by either solvent or propane dewaxing and can contain entrained oil in an amount varying up to about 50%, preferably 35% oil, more preferably 25% oil, Fischer-Tropsch wax, which is a synthetic wax produced by the catalyzed reaction of CO and $H_2$. Other waxy feeds such as waxy distillates or waxy raffinates which can contain anywhere from 5 to 95% wax can also be used.

Should the practitioner so desire, the feed can be mildly solvent dewaxed (e.g. to a pour point of about 5° C. or 0° C.) prior to the upgrading process to recover valuable wax. Solvent dewaxing utilizes typical dewaxing solvents such as $C_3$–$C_6$ ketones (e.g., methyl ethyl ketone, methyl isobutyl ketone and mixtures thereof), $C_6$–$C_{10}$ aromatic hydrocarbons (e.g., toluene) mixtures of ketones and aromatics (e.g., MEK/toluene), autorefrigerative solvents such as liquefied, normally gaseous $C_2$–$C_4$ hydrocarbons such as propane, propylene, butane, butylene and mixtures thereof, etc. at filter temperature of $-25°$ C. to $-30°$ C. The feed, still containing residual wax is then subjected to the upgrading process.

Waxy feeds secured from natural petroleum sources contain quantities of sulfur and nitrogen compounds which are known to deactivate wax hydroisomerization catalysts. To prevent this deactivation it is preferred that the feed contain no more than 10 ppm sulfur, preferably less than 2 ppm sulfur and no more than 2 ppm nitrogen, preferably less than 1 ppm nitrogen.

To achieve these limits the feed is preferably hydrotreated to reduce the sulfur and nitrogen content.

Hydrotreating can be conducted using any typical hydrotreating catalyst such as Ni/No on alumina, Co/Mo on alumina, Co/Ni/Mo on alumina, e.g., KF-840, KF-843, HDN-30, HDN-60, Criteria C-411, etc. Similarly, bulk catalysts comprising Ni/Mn/Mo or Cr/Ni/Mo sulfides as described in U.S. Pat. No. 5,122,258 can be used.

Hydrotreating is performed at temperatures in the range 280° to 400° C., preferably 340° to 380° C. at pressures in the range 500 to 3000 psi, hydrogen treat gas rate in the range of 500 to 5000 SCF/bbl and a flow velocity in the range 0.1 to 5 LHSV, preferably 1 to 2 LHSV.

The upgrading process is practiced at a temperature in the range 300° to 375° C., preferably 330° to 360° C., a pressure in the range 500 to 3000 psi, preferably 1000 to 1500 psi, a hydrogen treat gas rate in the range of 1000 to 10,000 SCF/bbl, preferably 1000 to 3000 SCF/bbl and a flow velocity of 0.1 to 10 LHSV, preferably 0.5 to 2 LHSV.

In both the hydrotreating and upgrading steps, the hydrogen used can be either pure or plant hydrogen (~50–100% $H_2$).

Following upgrading the total liquid product is fractionated into a lubes cut and fuels cut, the lubes cut being characterized as having a kinematic viscosity of about 2.5 cSt and higher, at 100° C., preferably about 3.0 cSt and higher at 100° C., most preferably about 4 cSt and higher at 100° C.

Preferably it has been found that the total liquid product (TLP) from the upgrading process can be advantageously treated in a second stage at mild conditions using isomerization catalyst or simply noble Group VIII on refractory metal oxide catalyst to reduce PNA and other contaminants in the upgraded product and thus yield an oil of improved daylight stability. The total liquid product is passed over a charge of hydrotreating catalyst, isomerization catalyst or over just noble Gp VIII on e.g. transition alumina. The conditions used include a temperature in the range of about 170°–270° C., preferably about 180° C. to 220° C., at pressures of about 300 to 2500 psi $H_2$, preferably 500 to 1500 psi H2, a hydrogen gas rate of about 500 to 10,000 SCF/bbl, preferably 1000 to 5000 SCF/bbl and a flow velocity of about 0.25 to 10 v/v/hr. preferably about 1–4 v/v/hr. Temperatures at the high end of the range should be employed only when similarly employing pressures at the high end of their recited range. Temperatures in excess of those recited may be employed if pressures in excess of 1500 psi are used, but such high pressures may not be practical or economic. A variation of the procedures is covered in U.S. Pat. No. 5,158,671.

The total liquid product is treated under these conditions in a separate, dedicated unit. It has been found to be unnecessary to fractionate the first stage product prior to this mild second stage treatment. Subjecting the whole product to this mild second stage treatment produces an oil product which upon subsequent fractionation and dewaxing yields a base oil exhibiting a high level of daylight stability and oxidation stability. These base oils can be subjected to subsequent hydrofinishing using conventional catalysts such as KF-840 or HDN-30 (e.g., Co/Mo or Ni/Mo on alumina) at conventional conditions to remove undesirable process impurities to further improve product quality.

The unitized pellet catalyst can contain the individual powdered components which make it up in a broad ratio. Thus, the components can be present in the ratio in the range 1:100 or more to 100 or more: 1, preferably 1:3 to 3:1.

Theta-1 (TON) is a 10-ring, unidirectional silica alumina zeolite for which isotropic framework structures include: ZSM-22, NU-10, ISI-1, and KZ-2. This catalyst possesses excellent catalytic dewaxing potential with high wax content oils and is known to be highly active. The isomerization catalyst 0.3% Pt/1%F/Al2O3 is a mildly acidic, highly active isomerization catalyst for producing high VI base oils from slack wax and waxy raffinates. It was reasoned that a mixture of these two catalysts would produce a low wax content (low pour) and high VI base oil.

EXAMPLE 1

A 600N waxy raffinate was hydrotreated over a C-411 hydrotreating catalyst then stripped to remove $H_2S$ and ammonia.

C-411 is a commercial hydrotreating catalyst from Criterion. It is a 1/20" trilobe catalyst containing 2.6% wt % Ni and 14.3% wt % Mo on an alumina base. Its physical properties as quoted in the product bulletin are: surface area=165 m$^2$/g, pore volume=0.43 cc/g, bulk crush strength=12.7 kg/cm$^2$ and attrition index=98+ wt %.

The hydrotreated feed following stripping was then sent to units containing either a mixed or stacked bed of discrete particles (25% of a 0.25% Pd loaded TON/75% of a 0.3% Pt/1% F/Al$_2$O$_3$ isom catalyst and wherein in the case of the stacked bed the particles of TON were on top of the isom catalyst component) or a bed of unitized mixed powder pellet catalyst made by blending 25% powdered 0.25 Pd TON with 75% powdered 0.3% Pt/1% F-Al$_2$O$_3$ and pelleting the resulting blended powder. The TON has a silica alumina ratio of about 60:1. In all three cases the effluent from these units was then sent to a second reactor loaded with 0.3% Pt/1% F-Al$_2$O$_3$ and run at 200° C. as a stabilization step (in accordance with U.S. Pat. No. 5,158,671). All reactors were run in up-flow mode.

In all cases the catalysts were crushed and sieved to collect the 7–14 mesh (Tyler) fraction. The units employed 64 g (100 cc) of the 7–14 mesh particles. The catalysts were activated using the following procedure:

1. Hydrogen flow at 0.6 ft$^3$/h (approximately 0.6 SCF/h per 100 cc) at 2.4 MPa (350 psig). No liquid flow.
2. Heat at 8° C./h to 200° C.
3. Hold 24 h.
4. Increase pressure to 4.5 MPa (650 psig) and increase hydrogen rate to 1.6 ft$^3$/h.
5. Increase reactor temperature to 400° C. at 8° C./h and hold 400° C. for 4 h.
6. Cool to SOR operating temperature (330° C.).
7. Introduce feed (hydrotreated 600NR) at 330° C.

The feed was hydrotreated over C-411 at 370° C. 0.7/h LHSV, 1000 psig and 1500 SCF/bbl pure hydrogen treat gas rate. Hydrotreated feed was then introduced into the isomerization unit where the conditions initially were 330° C., 1.0/hr LHSV, 1000 psig total pressure and 2500 SCF/bbl pure hydrogen treat gas rate. The temperature was then increased stepwise to 340° C. and 360° C., all other operating conditions being held constant.

The total liquid product from the isomerization unit was fractionated by modified Hivac (Topping) to produce a 370° C. cut (lubes cut) which was analyzed for pour point.

The results obtained in this Example are presented in Tables 1A, 1B, and 1C.

The Tables show that the product obtained using the unitized pellet catalyst (having a VI of 106) is of lower pour point (−29° to <−46° C.) as compared to the product obtained using a mixed bed of Pd TON pellet catalyst and 0.3% Pt/1%F-Al$_2$O$_3$ pellet catalyst (having a VI of 111 and a pour point of −4° to −11° C.) or a stacked bed of discrete pellets (VI-110-114 and a pour point of −2° to −7° C.) at equivalent reactor temperatures.

TABLE 1A

| CATALYST | 600N RAFFINATE | Hydrotreatment | 25% Pd TON, 75% ISOM CAT | 25% Pd TON, 75% ISOM CAT (Blended Powders & Pelleted) | 25% Pd TON, 75% ISOM Cat |
|---|---|---|---|---|---|
| Temperature, °C. | | 370 | 330 | 340 | 360 |
| Pressure, PSI | | 1000 | 1000 | 1000 | 1000 |
| LHSV | | 0.75 | 1 | 1 | 1 |
| SCF/B | | 2500 | 2500 | 2500 | 2500 |
| Knockout Liquid Yield on Feed | | | 9.55 | 8.72 | 8.17 |
| Bottoms Liquid Yield on Feed | | 99 | 87 | 83.8 | 76.6 |
| 370° C.+ Topped Yield on Bottoms | 100 | 95.1 | 84.4 | 82.3 | 71.9 |
| 370° C.− Fuels | 0 | 4.9 | 15.6 | 17.7 | 28.1 |
| Dry Wax, wt % | 23.7 | 26.9 | 0 | 0 | 0 |
| Overall DWO Yield on Feed | 76.30 | 68.82 | 69.83 | 65.59 | 52.38 |
| Topped to 370° C. (Yes or No) | Y | N (Stripped) | Y | Y | Y |
| R.I. @ 75° C. | | | | | |
| Density @ 15° C. | 0.8815 | 0.867 | | | |
| H.A. Sulfur, wppm | 4700 | 2.2 | 1.3 | <1 | |
| Antek N, wppm | 89 | <1 | <1 | <1 | <2 |
| FLS Sats, wt % | 69.57 | | 94.2 | 92.25 | 86.62 |
| FLS Aromatics, wt % | 30.43 | | 5.8 | 7.75 | 13.38 |
| Viscosity, cSt @ 40° C. | | | 70.11 | 66.83 | 53.61 |
| Viscosity, cSt @ 100° C. | 10.889 | 8.065 | 9.157 | 8.852 | 7.642 |
| VI | | | 106 | 106 | 106 |
| % C | 86.6 | | | | |
| % H | 13.4 | | | | |
| Pour Point, °C. | 52 | 53 | −29 | −33 | <−46 |
| DSC Wax, wt % | 28.9 | | | | |
| Noack Volatility (GCD, wt %) | 1.8 | 9.2 | 6.2 | 6.5 | 9.9 |
| IBP, °C. | 391 | 250 | 342 | 344 | 331 |
| 5% off. °C. | 444 | 350 | 392 | 390 | 373 |
| 50% off. °C. | 506 | 494 | 490 | 488 | 477 |
| 95% off. °C. | 576 | 567 | 564 | 563 | 555 |
| FBP, °C. | 616 | 605 | 611 | 611 | 603 |
| Topped to 370° C. (Y or N) | Y | Y | | | |
| H. A. Sulfur, wppm | 5800 | 5.1 | | | |

TABLE 1A-continued

| CATALYST | 600N RAFFINATE | Hydrotreatment | 25% Pd TON, 75% ISOM CAT | 25% Pd TON, 75% ISOM CAT | 25% Pd TON, 75% ISOM Cat |
|---|---|---|---|---|---|
| | | | (Blended Powders & Pelleted) | | |
| Antek N, wppm | 114 | <1 | | | |
| Viscosity, cSt @ 40° C. | 128,802 | 76.27 | | | |
| Viscosity, cSt @ 100° C. | 12.863 | 9.658 | | | |
| VI | 91.6 | 105 | | | |
| Pour Point, °C. | −23 | −24 | | | |
| Noack Volatility (GCD, wt %) | 1.9 | 5.3 | | | |
| IBP | 387 | 343 | | | |
| 5% off | 442 | 399 | | | |
| 50% off | 504 | 494 | | | |
| 55% off | 574 | 564 | | | |
| FBP | 609 | 602 | | | |

TABLE 1B

| CATALYST | 600N RAFFINATE | HYDROTREATMENT | 25% Pd TON 75% ISOM CAT | 25% Pd TON 75% ISOM CAT | 25 Pd TON 75% ISOM CAT |
|---|---|---|---|---|---|
| | | | (STACKED BEDS) | | |
| Temperature, °C. | | 395 | 330 | 340.5 | 360.4 |
| Pressure, PSI | | 1000 | 1000 | 1000 | 1000 |
| LHSV | | 0.75 | 1 | 1 | 1 |
| SCF/B | | 2500 | 2500 | 2500 | 2500 |
| Knockout Liquid Yield on Feed | | | 0.00 | 0.85 | 1.41 |
| Bottoms Liquid Yield on Feed | | 99 | 89 | 83.2 | 77.8 |
| 370° C.+ Tapped Yield on Bottoms | 100 | 96.0 | 85 | 82.9 | 73.5 |
| 370° C.− Fuels | 0 | 5 | 15 | 17.1 | 26.5 |
| Dry Wax, wt % | 23.7 | 26.30 | | | |
| Overall DWO Yield on Feed | 76.30 | 60.78 | 71.34 | 65.04 | 53.92 |
| Topped to 370° C. (Y or N) | Y | N (Stripped) | Y | Y | Y |
| R.I. @ 75° C. | | 1.4551 | | | |
| Density @ 15° C. | 0.8815 | 0.8668 | | | |
| H. A. Sulfur wppm | 4700 | 3.2 | | | |
| Antek N. wppm | 89 | 0.5 | | | |
| FLS Sats, wt % | 69.57 | 85.6 | | | |
| FLS Aromatics, wt % | 30.43 | 14.4 | | | |
| Viscosity, cSt @ 40° C. | | | 66.46 | 62.56 | 49.39 |
| Viscosity, cSt @ 100° C. | 10.889 | 8.003 | 8.974 | 8.622 | 7.464 |
| VI | | | 110 | 110 | 114 |
| % C | 86.6 | 85.82 | | | |
| % H | 13.4 | 14.18 | | | |
| Pour POint, °C. | 52 | | −2 | −3 | −7 |
| DSC Wax, wt % | 28.9 | 38.3 | | | |
| Noack Volatility (GCD, wt %) | 1.9 | 9 | 5.8 | 6.5 | 9.6 |
| IBP, °C. | 391 | 235 | 345.6 | 341.6 | 329 |
| 5% off, °C. | 444 | 350.5 | 394.3 | 389.2 | 372.7 |
| 50% off, °C. | 506 | 494.5 | 491.1 | 488.2 | 478 |
| 95% off, °C. | 576 | 566.6 | 564.1 | 561.9 | 554.1 |
| IBP, °C. | 616 | 605.3 | 602.4 | 601.2 | 592.7 |
| Topped to 370° C. (Y or N) | Y | N (Stripped) | | | |
| H. A. Sulfur, wppm | 5600 | | | | |
| Antek N, wppm | 114 | | | | |
| FLS Sats, wt % | 63.25 | | | | |
| FLS Aromatics, wt % | 36.75 | | | | |
| Viscosity, cSt @ 40° C. | 128.802 | 66.803 | | | |
| Viscosity, cSt @ 100° C. | 12.863 | 8.59 | | | |
| VI | 91.6 | 106 | | | |
| Pour Point, °C. | −23 | −23 | | | |
| Noack Volatility (GCO, wt %) | 1.9 | 9.9 | | | |
| IBP | 387 | 265.3 | | | |
| 5% off | 442 | 347.4 | | | |
| 50% off | 504 | 490.9 | | | |
| 95% off | 574 | 563.6 | | | |
| FBP | 609 | 600.5 | | | |

TABLE 1C

| CATALYST | 600N RAFFINATE | HYDROTREATMENT | 25% Pd TON 75% ISOM CAT | 25% Pd TON 75% ISOM CAT | 25% Pd TON 75% ISOM CAT |
|---|---|---|---|---|---|
| | | | (MIXED PELLETS) | | |
| Temperature, °C. | | 370 | 330 | 340 | 360 |
| Premium, PSI | | 1000 | 1000 | 1000 | 1000 |
| LHSV | | 0.7 | 1 | 1 | 1 |
| SCF/8 | | 1500 | 2500 | 2500 | 2500 |
| 370° C.+ Tapped Yield on Bottoms | 100 | | 83.9 | 84.9 | 73.7 |
| 370° C.− Fuel | 0 | | 16.1 | 15.1 | 26.3 |
| Dry Wax, wt % | 23.7 | | 7.69 | 8.50 | 2.61 |
| Overall DWO Yield on Feed | 76.30 | | | | |
| Topped to 370° C. (Y or N) | Y | N (Stripped) | | Y | Y |
| R.I. @ 75° C. | | | | | |
| Density @ 15° C. | 0.9815 | 0.9651 | | | |
| H. A. Sulfur, wppm | 4700 | <1 | | | |
| Antek N, wppm | 89 | 0.5 | | | |
| FLS Sats, wt % | 69.57 | | | | |
| FLS Aromatics, wt % | 30.43 | | | | |
| Viscosity, cSt @ 40° C. | | | | 63 | 53.7 |
| Viscosity, cSt @ 100° C. | 10.989 | 7.797 | | 8.696 | 7.816 |
| VI | | | | 111 | 111 |
| % C | 86.6 | 85.99 | | | |
| % H | 13.4 | 14.01 | | | |
| Pour Point, °C. | 52 | 55 | −4 | −3 | −11 |
| DSC Wax, wt % | 28.9 | 27.34 | | | |
| Noack Volatility (GCO, wt %) | 1.9 | 9.4 | | | |
| IBP, °C. | 391 | 269.4 | | | |
| 5% off, °C. | 444 | 352 | | | |
| 50% off, °C. | 506 | 491.8 | | | |
| 95% off, °C. | 576 | 564.6 | | | |
| FBP, °C. | 616 | 602.3 | | | |
| Topped to 370° C. (Y or N) | Y | | Y | Y | Y |
| H. A. Sulfur, wppm | 5600 | | <3.2 | 6.2 | <3.3 |
| Antek N, wppm | 114 | | <1.6 | <1.6 | <1.7 |
| FLS Sats, wt % | 63.25 | | 93.1 | 91.64 | 89.47 |
| FLS Aromatics, wt % | 36.75 | | 6.9 | 8.36 | 10.53 |
| Viscosity, cSt @ 40° C. | 128.802 | | 66.3 | 65.651 | 53.951 |
| Viscosity, cSt @ 100° C. | 12.863 | | 8.857 | 8.813 | 7.763 |
| VI | 91.6 | | 107.1 | 107.4 | 108.6 |
| Pour Point, °C. | −23 | | −23 | −25 | −30 |
| DSC Wax, wt % | | | 17.51 | 17.05 | 13.55 |
| NMR H. wt % | | | 13.92 | 13.81 | 13.94 |
| Noack Volatility (GCO, wt %) | 1.9 | | 6.2 | 6.4 | 8.8 |
| IBP | 387 | | 346 | 346 | 339 |
| 5% off | 442 | | 391 | 390 | 377 |
| 50% off | 504 | | 489 | 477 | 479 |
| 95% off | 574 | | 561 | 560 | 555 |
| FBP | 609 | | 600 | 600 | 597 |

EXAMPLE 2

The same 600N raffinate of Example 1 was subjected to hydrotreatment over a C-411 hydrotreating catalyst then, following stripping to remove $H_2S$ and ammonia was fed to a unit loaded only with palladium loaded TON catalyst pellets (0.25 wt % Pd) operated under a range of conditions.

The conditions of operations and the results of the runs are presented in Table 2 below.

TABLE 2

| CATALYST | 600N | C-411 | 0.25% Pd TON | 0.25% Pd TON | 0.25% Pd TON |
|---|---|---|---|---|---|
| Temperature, °C. | | 370 | 300.3 | 330.6 | 360.5 |
| Pressure, PSI | | 1000 | 1000 | 1000 | 1000 |
| LHSV | | 0.74 | 1.01 | 1.05 | 1.01 |
| SCF/B | | 2368 | 2460 | 2342 | 2369 |
| Knockout Liquid Yield on Feed | | | 3.57 | 3.89 | 7.14 |
| Bottoms Liquid Yield on Feed | | 100.4 | 92.30 | 81.6 | 73.3 |
| 370° C.+ Topped Yield on Bottoms | 100 | 93.4 | 83.1 | 82 | 81 |
| 370° C.− Fuels | 0 | 16.6 | 16.9 | 18 | 19 |

TABLE 2-continued

| CATALYST | 600N | C-411 | 0.25% Pd TON | 0.25% Pd TON | 0.25% Pd TON |
|---|---|---|---|---|---|
| Dry Wax, wt % | 23.7 | 20.1 | | | |
| Overall DWO Yield on Feed | 76.30 | 74.93 | 77.01 | 67.18 | 59.61 |
| Topped to 370° C. (Yes or No) | Y | N (Stripped) | Y | Y | Y |
| R.I. @ 75° C. | | 1.4545 | | | |
| Density @ 15° C. | 0.8815 | 0.865 | | | |
| H. A. Sulfur, wppm | 4700 | 1.9 | 1.1 | 0.8 | 0.6 |
| Antek N, wppm | 89 | 0.5 | 0.5 | 0.5 | 0.5 |
| FLS Sats, wt % | 69.57 | 85.46 | 91.7 | 90.01 | 89.71 |
| FLS Aromatics, wt % | 30.43 | 14.54 | 8.3 | 9.99 | 10.29 |
| Viscosity, cSt @ 40° C. | | | 68 | 64.88 | 63.59 |
| Viscosity, cSt @ 100° C. | 10.889 | 7.61 | 9.188 | 8.837 | 8.734 |
| VI | | | 111 | 110 | 110 |
| % C | 86.6 | 86.06 | 85.94 | 86.09 | 85.95 |
| % H | 13.4 | 13.92 | 14.06 | 13.91 | 14.05 |
| Pour Point, °C. | 52 | 55 | −1 | −4 | −6 |
| DSC Wax. wt % | 28.9 | | | | |
| Noack Volatility (GCD, wt %) | 1.8 | 10.9 | 5.4 | 5.9 | 6.2 |
| IBP, °C. | 391 | 250.6 | 344.6 | 344.4 | 345.8 |
| 5% off, °C. | 444 | 332.5 | 397.1 | 393.6 | 390.8 |
| 50% off, °C. | 506 | 491.9 | 493.3 | 489.6 | 490 |
| 95% off, °C. | 576 | 565.9 | 565.9 | 561.9 | 563 |
| FBP, °C. | 616 | 604.5 | 605.2 | 598.3 | 601.4 |
| Solvent DWO | | | | | |
| Topped to 370° C. (Y or N) | Y | Y | | | |
| H. A. Sulfur, wppm | 5600 | | | | |
| Antek N, wppm | 114 | | | | |
| FLS Sats, wt % | 63.25 | 81.8 | | | |
| FLS Aromatics, wt % | 366.75 | 18.2 | | | |
| Viscosity, cSt @ 40° C. | 128.802 | 66.39 | | | |
| Viscosity, cSt @ 100° C. | 12.863 | 9.068 | | | |
| VI | 91.6 | 112 | | | |
| Pour Point, °C. | −23 | −8 | | | |
| Noack Volatility (GCD, wt %) | 1.9 | | | | |
| IBP | 387 | | | | |
| 5% off | 442 | | | | |
| 50% off | 504 | | | | |
| 95% off | 574 | | | | |
| FBP | 609 | | | | |

EXAMPLE 3

The same 600N raffinate of Example 1 was subjected to hydrotreatment over a C-411 hydrotreating catalyst, then stripped to remove $H_2S$ and ammonia and the stripped product was fed to a unit containing unitized blended powder pellets catalyst comprising 25% of a 0.25 wt % Pd on ZSM-5/75% of a 0.3 wt % Pt, 1% $F/Al_2O_3$. The ZSM-5 had a silica/alumina ratio of about 64:1. The conditions and results are reported in Table 3 below:

TABLE 3

| CATALYST | FEED TO H07 600N RAFFINATE | FEED TO H06 | 25% Pd ZSM5 75% RTF-10 | 25% Pd ZSM5 75% RFT-10 (BLENDED POWDERS) |
|---|---|---|---|---|
| Temperature,°C. | | 370 | 270.1 | 299.8 |
| Pressure, PSI | | 1000 | 1000 | 1000 |
| LHSV | | 0.73 | 1 | 1.02 |
| SCF/B | | 2438 | 2497 | 2447 |
| Knockout Liquid Yield on Feed | | | 6.87 | 7.60 |
| Bottoms Liquid Yield on Feed | | 100.5 | 91.9 | 83 |
| 370° C.+ Topped Yield on Bottoms | 100 | 95.6 | 85.2 | 84.5 |
| 370° C.− Fuels | 0 | 4.4 | 14.8 | 15.5 |
| Dry Wax, wt % | 23.7 | 24.27 | | |
| Overall DWO Yield on Feed | 76.30 | 72.76 | 78.69 | 70.49 |
| Topped to 370° C. (Yes or No) | Y | N (Stripped) | Y | Y |
| R.I. @ 75° C. | | 1.4557 | | |

TABLE 3-continued

| CATALYST | FEED TO H07 600N RAFFINATE | FEED TO H06 | 25% Pd ZSM5 75% RTF-10 | 25% Pd ZSM5 75% RFT-10 (BLENDED POWDERS) |
|---|---|---|---|---|
| Density @ 25° C. | 0.8815 | 0.8682 | | |
| H. A. Sulfur, wppm | 4700 | 3.7 | | |
| Antek N, wppm | 89 | 0.5 | | |
| FLS Sats, wt % | 69.57 | 83.05 | | |
| FLS Aromatics, wt % | 30.43 | 16.95 | | |
| Viscosity, cSt @ 40° C. | | | 82.37 | 86.75 |
| Viscosity, cSt @ 100° C. | 10.889 | 8.325 | 10.1 | 10.16 |
| VI | | | 103 | 97 |
| % C | 86.6 | | | |
| % H | 13.4 | | | |
| Pour Point, °C. | 52 | | −3 | −19 |
| DSC Wax, wt % | 28.9 | | | |
| Noack Volatility (GCD, wt %) | 1.8 | 8.1 | 4.5 | 5.4 |
| IBP, °C. | 391 | 262.9 | 355.4 | 350.8 |
| 5% off, °C. | 444 | 363.9 | 406.3 | 397.6 |
| 50% off, °C. | 506 | 495.3 | 495.4 | 492.1 |
| 95% off, °C. | 576 | 566.6 | 566.3 | 564 |
| FBP, °C. | 616 | 602.5 | 603.8 | 599.9 |
| Mass Spec (ASTM D2786-71) | | | | |
| 0 Ring Isoparaffins | 30.7 | 31.3 | | |
| 1-Ring Cycloparaffins | 14.2 | 21.5 | | |
| 2-Ring Cycloparaffins | 12.8 | 17 | | |
| 3-Ring Cycloparaffins | 11.2 | 10.9 | | |
| 4-Ring Cycloparaffins | 9.2 | 5.3 | | |
| 5-Ring Cycloparaffins | 2.5 | 1.7 | | |
| 6-Ring Cycloparaffins | 2.7 | 0.6 | | |
| Monoaromatics | 16.8 | 11.8 | | |
| DWO Code # | DNZ-000428 | DNZ-001176 | | |
| Topped to 370° C. (Y or N) | Y | Y | | |
| H. A. Sulfur, wppm | 5600 | 6.5 | | |
| Antek N, wppm | 114 | 0.5 | | |
| FLS Sats, wt % | 63.25 | 79.54 | | |
| FLS Aromatics, wt % | 36.75 | 20.46 | | |
| Viscosity, cSt @ 40° C. | 128.802 | 79.49 | | |
| Viscosity, cSt @ 100° C. | 12.863 | 9.883 | | |
| VI | 91.6 | 104 | | |
| Pour Point | −23 | −18 | | |
| DSC Wax, wt % | | | | |
| NMR H, wt % | | | | |
| Noack Volatility (GCD, wt %) | 1.9 | 4.7 | | |
| IBP | 387 | 347.2 | | |
| 5% off | 442 | 404.8 | | |
| 50% off | 504 | 494.2 | | |
| 95% off | 574 | 564 | | |
| FBP | 609 | 598.2 | | |
| Mass Spec (ASTM D2786-71) | | | | |
| 0 Ring Isoparaffins | 20.5 | 21.2 | | |
| 1-Ring Cycloparaffins | 15.3 | 22.3 | | |
| 2-Ring Cycloparaffins | 15 | 19.8 | | |
| 3-Ring Cycloparaffins | 13.2 | 12.8 | | |
| 4-Ring Cycloparaffins | 10.6 | 6.7 | | |
| 5-Ring Cycloparaffins | 2.5 | 2.8 | | |
| 6-Ring Cycloparaffins | 2.7 | 1.4 | | |
| Monoaromatics | 20.2 | 13.1 | | |

From this it is seen that not all zeolites are appropriate for use in the present invention. The mixed powder pellet catalyst containing 25 wt % Pd/ZSM-5 produced a product of only 97 VI with a pour point of −19° C. on a feed which if simply solvent dewaxed would have a VI of 104 and a pour point of −18. This is to be compared with the product produced using a mixed powder pellet catalyst containing 25 wt % Pd-TON (Example 1) which had a VI of 106 and a pour point of −46° C. (on a feed which if simply solvent dewaxed would have a VI of 105 and a pour of −24° C.) or even with the product produced in Example 2 using only Pd/TON (no isom catalyst component) which had a VI of 110 and a pour point of −6 on a feed which if simply solvent dewaxed would have a VI of 112 and a pour point of −8° C. ZSM-5 is an oval pore zeolite but is not unidirectional. This is to be compared with the structure of Theta-1 (TON or ZSM-22) which is a 10 member ring-unidirectional pore material wherein the pores are oval.

EXAMPLE 4

A 250N raffinate was hydrotreated over a C-411 hydrotreating catalyst, stripped to remove H2S and ammonia then fed to units containing either unitized mixed powder pellet catalyst comprising 25 wt % of 0.25% Pd-ZSM-5/75 wt % of a 0.3% Pt/1.0% F/Al$_2$O$_3$ catalyst or a 0.25% Pd on TON catalyst. The ZSM-5 had a silica/alumina ratio of about 64:1. The conditions used and the results obtained are present in Table 4, below.

TABLE 4

| | Feed 250N RAFFINATE | C-411 | 0.25% Pd TON | 0.25% Pd TON | 0.25% Pd TON | 25% Pd ZSM5 75% ISOM CAT | 25% Pd ZSM5 75% ISOM CAT | 25% Pd ZSM5 75% ISOM CAT BLENDED POWDERS/PELLETED |
|---|---|---|---|---|---|---|---|---|
| Temperature, °C. | | 370 | 300.5 | 330.4 | 360.3 | 300.3 | 280.2 | 269.2 |
| Pressure, PSI | | 1000 | 1000 | 1000 | 1000 | 1000 | 1000 | 1000 |
| LHSV | | 0.73 | 1 | 1.01 | 1.06 | 1.01 | 1.04 | 1.01 |
| SCF/B | | 3149 | 2525 | 2491 | 2331 | 2461 | 2380 | 2412 |
| Knockout Liquid Yield on Feed | | | 5.84 | 5.54 | 7.81 | 13.32 | 9.57 | 6.05 |
| Bottoms Liquid Yield on Feed | | 96.7 | 91.4 | 83.6 | 68.7 | 74.8 | 80.3 | 85.4 |
| 370° C.+ Topped Yield on Bottoms | 100 | 92.3 | 79.9 | 79.2 | 77.7 | 76.6 | 77.9 | 79.3 |
| 370° C.- Fuels | 0 | 7.7 | 20.1 | 20.8 | 22.3 | 23.2 | 22.1 | 20.7 |
| Dry Wax, wt % | 17.7 | 20.5 | | | | | | |
| Overall DWO Yield on Feed | 82.30 | 70.96 | 70.62 | 64.03 | 51.62 | 55.55 | 60.49 | 65.49 |
| Topped to 370° C. (Yes or No) | Y | N (Stripped) | Y | Y | Y | Y | Y | Y |
| R.I. @ 75° C. | 1.4598 | | | | | | | |
| Density @ 15° C. | 0.8754 | | | | | | | |
| H. A. Sulfur, wppm | 7200 | 1.6 | 0.6 | 0.7 | 0.5 | 0.5 | 0.5 | 0.5 |
| Antek N, wppm | 44 | 0.5 | 0.5 | 0.5 | 0.5 | 0.5 | 0.5 | 0.5 |
| FLS Sats, wt % | 71.8 | 87.8 | 87.6 | 89.34 | 91.54 | 93.48 | 92.55 | 91.91 |
| FLS Aromatics, wt % | 26.2 | 12.2 | 12.4 | 10.66 | 8.46 | 6.52 | 7.45 | 8.09 |
| Viscosity, cSt @ 40° C. | | | 37.48 | 37.66 | 36.53 | 44.97 | 43.72 | 41.99 |
| Viscosity, cSt @ 100° C. | 6.855 | 5.091 | 6.176 | 6.154 | 6.024 | 6.563 | 6.575 | 6.473 |
| VI | | | 112 | 110 | 109 | 95 | 101 | 104 |
| % C | 86.28 | 85.82 | 86.06 | | 85.82 | | | |
| % H | 13.72 | 14.18 | 13.94 | | 14.18 | | | |
| Pour Point, °C. | 38 | | -9 | -14 | -16 | -49 | -24 | -17 |
| DSC Wax, wt % | 32.5 | | | | | 7.6 | 14.23 | |
| Noack Volatility (GCD, wt %) | 6.2 | 17.2 | 10.5 | 10.5 | 11.4 | | 10.6 | 10.2 |
| IBP, °C. | | 243.1 | 335.4 | 335.4 | 330.3 | 330.2 | 336.1 | 337.2 |
| 5% off, °C. | | 311.9 | 378.7 | 378.9 | 373.9 | 371.2 | 378.3 | 380.7 |
| 50% off, °C. | | 449.3 | 451.7 | 452.3 | 450.7 | 448.4 | 451.4 | 452.2 |
| 95% off, °C. | | 509.8 | 510 | 510.6 | 509.3 | 508.1 | 509.5 | 509.8 |
| FBP, °C. | | 545.5 | 541.4 | 542.4 | 541.3 | 539.8 | 540 | 540.4 |
| DWO Code # | GGM-000513 | DNZ-001153 | | | | | | |
| Topped to 370° C. (Yes or No) | Y | Y | | | | | | |
| H. A. Sulfur, wppm | 8500 | | | | | | | |
| Antek N, wppm | 47 | | | | | | | |
| FLS Sats, wt % | 67.38 | 84.7 | | | | | | |
| FLS Aromatics, wt % | 32.62 | 15.3 | | | | | | |
| Viscosity, cSt @ 40° C. | 50.38 | 35.28 | | | | | | |
| Viscosity, cSt @ 100° C. | 7.154 | 5.987 | | | | | | |
| VI | 96 | 114 | | | | | | |
| Pour Point, °C. | -16 | -17 | | | | | | |
| DSC Wax, wt % | | | | | | | | |
| NMR H, wt % | | | | | | | | |
| Noack Volatility (GCD, wt %) | | 10.8 | | | | | | |
| IBP | | 329.6 | | | | | | |
| 5% off | | 376.7 | | | | | | |
| 50% off | | 451.9 | | | | | | |
| 95% off | 509.9 | | | | | | | |
| FBP | 541.9 | | | | | | | |

From this it is seen that using a unitized mixed powder pellet catalyst containing 25 wt % of a zeolite of the kind ZSM-5 produces a product of lower VI (VI#104 at equivalent pour point) as compared to the product obtained by practicing either solvent dewaxing (VI 114) or treatment using only 0.25% Pd-TON (VI#109). There is no advantage to using a mixed powder pellet catalyst wherein one of the components is of the type represented by ZSM-5, i.e. an oval pore zeolite which is not unidirectional.

What is claimed is:

1. A unitized mixed powder pellet upgrading catalyst made by mixing powdered molecular sieve dewaxing catalyst comprising a 10 member ring unidirectional pore inorganic oxide molecular sieve with a powdered amorphous isomerization catalyst comprising a catalytically active metal selected from Group VIB, Group VIIB and Group VIII metals and mixtures thereof on a refractory metal oxide support base, wherein the dewaxing catalyst has an acidity of from about 2.5 to 3.0 and the isomerization catalyst has an acidity of from about 0.3 to 2.5. said acidity being determined by the ability of the dewaxing catalyst and the isomerization catalyst to convert 2-methylpent-2-ene to 3-methylpent-2-ene and 4-methylpent-2-ene and is expressed as the mole ratio of 3-methylpent-2-ene to 4-methylpent-2-ene, and wherein the powdered molecular sieve dewaxing catalyst and the powdered isomerization catalyst are combined in a ratio in the range 1:100 to 100:1, mixing the powdered material together to form a homogeneous mass, compressing/extruding the mass and pelleting the compressed/extruded mass.

2. The catalyst of claim 1 wherein the powdered molecular sieve and the powdered isomerization catalyst are mixed together and boehmite or pseudo boehmite is added to the mixture, the mixture is compressed/extruded and pelleted and calcined to convert the boehmite/pseudo boehmite into alumina producing the unitized catalyst pellets.

3. The catalyst of claims 1 or 2 wherein the 10 number ring unidirectional pore inorganic oxide molecular sieve has generally oval 1-D pores having a minor axis between about 4.2 Å and about 4.8 Å and a major axis between about 5.4 Å and about 7.0 Å as determined by X-ray crystallography.

* * * * *